US012124902B2

(12) United States Patent
Swift

(10) Patent No.: US 12,124,902 B2
(45) Date of Patent: Oct. 22, 2024

(54) INDUSTRIAL ELECTRONIC BADGE

(71) Applicant: Crown Equipment Corporation, New Bremen, OH (US)

(72) Inventor: Philip W. Swift, Oakwood, OH (US)

(73) Assignee: Crown Equipment Corporation, New Bremen, OH (US)

( * ) Notice: Subject to any disclaimer, the term of this patent is extended or adjusted under 35 U.S.C. 154(b) by 228 days.

(21) Appl. No.: 17/660,468

(22) Filed: Apr. 25, 2022

(65) Prior Publication Data

US 2022/0318585 A1 Oct. 6, 2022

Related U.S. Application Data

(63) Continuation of application No. 17/007,874, filed on Aug. 31, 2020, now Pat. No. 11,315,001, which is a continuation of application No. 15/685,163, filed on Aug. 24, 2017, now Pat. No. 10,762,409.

(60) Provisional application No. 62/379,732, filed on Aug. 25, 2016.

(51) Int. Cl.
| | |
|---|---|
| *G06Q 10/0639* | (2023.01) |
| *G06K 7/10* | (2006.01) |
| *G06K 19/07* | (2006.01) |
| *G06K 19/077* | (2006.01) |

(Continued)

(52) U.S. Cl.
CPC ..... *G06K 19/0724* (2013.01); *G06K 7/10128* (2013.01); *G06K 19/0703* (2013.01); *G06K 19/07709* (2013.01); *G06K 19/07767* (2013.01); *G06Q 10/063* (2013.01); *G07C 1/10* (2013.01)

(58) Field of Classification Search
CPC ... G07C 1/10; G07C 5/02; G07C 5/08; G07C 5/085; G06Q 10/06398; G06Q 10/0639
See application file for complete search history.

(56) References Cited

U.S. PATENT DOCUMENTS

| | | |
|---|---|---|
| 6,059,576 A | 5/2000 | Brann |
| 8,825,124 B1 | 9/2014 | Davies et al. |
| 10,762,409 B2 | 9/2020 | Swift |

(Continued)

OTHER PUBLICATIONS

Examination report No. 1 for standard patent application dated Jul. 14, 2022; Australian Application No. 2017315396; IP Australia.

(Continued)

*Primary Examiner* — Benyam Haile
(74) *Attorney, Agent, or Firm* — Stevens & Showalter LLP

(57) ABSTRACT

An industrial system includes an electronic badge worn or otherwise transported by an industrial vehicle operator. The electronic badge has a housing, a processor, and a transceiver coupled to the processor that communicates on a personal-area network with a badge communicator that is provided on an industrial vehicle when the electronic badge and the badge communicator are in range of each other. Further, an activity sensor collects activity information about the industrial vehicle operator as the industrial vehicle operator performs work tasks. The electronic badge exchanges data collected by the activity sensor with the industrial vehicle, for communication to a remote server. An electronic message is communicated to the industrial vehicle for output to a display thereon, and the electronic message defines an assigned task that is based upon previously collected data from the activity sensor.

20 Claims, 11 Drawing Sheets

(51) Int. Cl.
*G06Q 10/063* (2023.01)
*G07C 1/10* (2006.01)

(56) References Cited

U.S. PATENT DOCUMENTS

| | | |
|---|---|---|
| 11,315,001 B2 | 4/2022 | Swift |
| 2002/0109580 A1 | 8/2002 | Shreve |
| 2002/0135466 A1 | 9/2002 | Bunyan |
| 2004/0176131 A1 | 9/2004 | Hilerio |
| 2005/0071234 A1 | 3/2005 | Schon |
| 2008/0154691 A1 | 6/2008 | Wellman et al. |
| 2009/0189743 A1 | 7/2009 | Cherian et al. |
| 2009/0193080 A1 | 7/2009 | Toscano |
| 2010/0205779 A1 | 8/2010 | Wang |
| 2010/0235891 A1 | 9/2010 | Oglesbee |
| 2011/0118903 A1 | 5/2011 | Kraimer et al. |
| 2011/0291927 A1 | 12/2011 | Slaby |
| 2012/0185622 A1 | 7/2012 | Capomaggio |
| 2013/0048720 A1 | 2/2013 | Lewis |
| 2014/0114699 A1 | 4/2014 | Amigo |
| 2015/0039269 A1* | 2/2015 | Mejegard ............ H04W 4/80 702/182 |
| 2015/0034668 A1 | 3/2015 | Manci |
| 2015/0064668 A1 | 3/2015 | Manci et al. |
| 2016/0001781 A1* | 1/2016 | Fung ................. G07C 9/37 701/36 |
| 2016/0125348 A1 | 5/2016 | Dyer |
| 2016/0225203 A1 | 8/2016 | Asmar |
| 2016/0232758 A1 | 8/2016 | Fletcher |
| 2016/0264387 A1 | 9/2016 | Yoon et al. |

OTHER PUBLICATIONS

Larracilla, Edgar Flores; Second Office Action dated May 25, 2023; Mexican Application No. MX/a/2019/002203; Mexican Institute of the Industrial Property; Mexico City, Mexico.

Decision of Patent Grant dated Jul. 26, 2022; Korean Application No. 10-2019-7008151; Korean Intellectual Property Office; Daejeon, Republic of Korea.

Babin, Giles; Office Action dated May 18, 2023; Canadian Application No. 3,031,236; CIPO; Quebec, Canada.

Notice of Acceptance, dated Jun. 22, 2023; Australian Patent Application No. 2017315396; IP Australia.

Notification of First Office Action dated Nov. 2, 2022; Chinese Application No. 201780048348.X; China National Intellectual Property Administration; Beijing, China.

* cited by examiner

INDUSTRIAL ELECTRONIC BADGE

CROSS REFERENCE TO RELATED APPLICATIONS

This application is a continuation of U.S. patent application Ser. No. 17/007,874, filed Aug. 31, 2020, entitled INDUSTRIAL ELECTRONIC BADGE, now allowed, which is a continuation of U.S. patent application Ser. No. 15/685,163, filed Aug. 24, 2017, entitled INDUSTRIAL ELECTRONIC BADGE, now issued as U.S. Pat. No. 10,762,409, which claims the benefit of U.S. Provisional Patent Application Ser. No. 62/379,732, filed Aug. 25, 2016, entitled INDUSTRIAL ELECTRONIC BADGE, the disclosures of which are hereby incorporated herein by reference.

BACKGROUND

The present disclosure relates to electronic badges that record user-based observational feedback for event tracking, and optionally, to badges that include multiple modes of operation such as badges that have one mode of operation when coupled to an industrial vehicle and another mode when used by a pedestrian.

Wireless strategies are deployed by business operations, including distributors, retail stores, manufacturers, etc., to improve the efficiency and accuracy of business operations. Further, wireless strategies may also be deployed by such business operations to avoid the insidious effects of constantly increasing labor and logistics costs.

For instance, in a typical industrial implementation, an industrial vehicle (e.g., forklift truck) is equipped with a communications device that links a corresponding industrial vehicle operator to a management system executing on an associated computer enterprise via a wireless transceiver. Essentially, the communications device is used as an interface to the management system to direct the tasks of the industrial vehicle operator, e.g., by instructing the forklift truck operator where and/or how to pick, pack, put away, move, stage, process or otherwise manipulate items within a facility.

BRIEF SUMMARY

According to aspects of the present disclosure, an industrial system includes an electronic badge worn or otherwise transported by an industrial vehicle operator. The electronic badge has a housing, a processor, and a transceiver coupled to the processor that communicates on a personal-area network with a badge communicator that is provided on an industrial vehicle when the electronic badge and the badge communicator are in range of each other. Further, an activity sensor collects activity information about the industrial vehicle operator as the industrial vehicle operator performs work tasks. The electronic badge exchanges data collected by the activity sensor with the industrial vehicle, for communication to a remote server. An electronic message is communicated to the industrial vehicle for output to a display thereon, and the electronic message defines an assigned task that is based upon previously collected data from the activity sensor.

According to further aspects of the present disclosure, an electronic badge comprises a processor, a first transceiver, and memory coupled to the processor. The memory includes a program that instructs the processor to perform an industrial operations application by: determining whether the electronic badge is coupled to an industrial vehicle via the first transceiver, performing actions in a first mode associated with a pedestrian if the electronic badge is not coupled to the industrial vehicle, performing actions in a second mode associated with the industrial vehicle if the electronic badge is coupled to the industrial vehicle.

DETAILED DESCRIPTION

According to various aspects of the present disclosure, systems and computer-implemented processes provide communication capabilities between electronic badges operating in an industrial application, e.g., constrained environment such as a warehouse, manufacturing environment, commercial operation, etc.

The disclosure herein provides electronic badges that improve wireless communication between nearby pedestrians, and between pedestrians and nearby operators of industrial vehicles.

In particular, various aspects of the present disclosure address the technical problem of event detection and responsiveness through the use of electronic badges. More particularly, the present disclosure provides a technical solution that utilizes wireless communication between electronic badges to generate events based upon observational data, which is enabled via temporary, wireless personal-area networks.

The technical solutions herein bring about several technical effects, including automated electronic badge communication through the combination of one or more personal-area networks and a local area network, improved machine-to-machine communication, and improved environmental and situational awareness between electronic badges. Moreover, the above technologies are improved by enabling mobile badges to collect observational data that cannot otherwise be collected by conventional data logging systems.

According to further aspects of the present disclosure, systems and computer-implemented processes provide for multi-mode electronic badges that operate in a first mode when communicably coupled to an industrial vehicle and in a second mode when not communicably coupled to an industrial vehicle. The disclosure herein improves the technologies of industrial vehicles and industrial management systems. In particular, various aspects of the present disclosure address the technical problem of logging onto an industrial vehicle and tracking/monitoring industrial workers.

The technical solutions herein bring about technical effects including situational awareness between industrial vehicles and electronic badges, augmenting a display system of industrial vehicles, and reducing hardware required to perform industrial tasks.

The disclosure herein also improves the operation of industrial vehicles and industrial management systems by fusing together different logon requirements and tracking features from multiple independent devices to enable industrial vehicles.

System Overview

Figure 1:
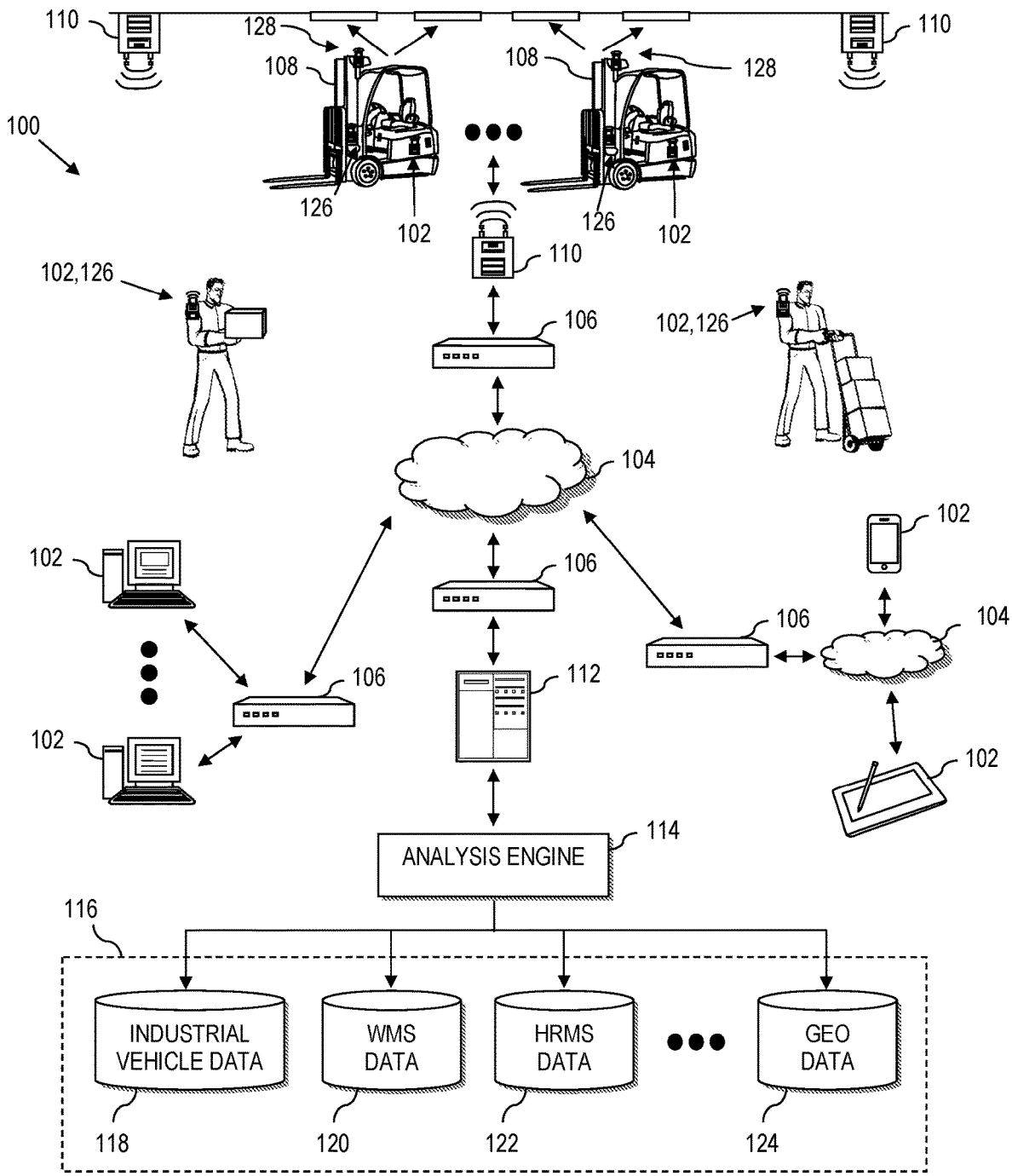
FIG. 1 is a block diagram of a system according to aspects of the disclosure.

Referring now to the drawings and in particular to FIG. 1, a general diagram of a system 100 is illustrated according to various aspects of the present disclosure. The illustrated system 100 is a special purpose (particular) computing environment that includes a plurality of hardware processing devices (designated generally by the reference 102) that are linked together by one or more network(s) (designated generally by the reference 104).

The network(s) 104 provides communications links between the various processing devices 102 and may be supported by networking components 106 that interconnect the processing devices 102, including for example, routers, hubs, firewalls, network interfaces, wired or wireless communications links and corresponding interconnections, cellular stations and corresponding cellular conversion technologies (e.g., to convert between cellular and TCP/IP, etc.). Moreover, the network(s) 104 may comprise connections using one or more intranets, extranets, local area networks (LAN), wide area networks (WAN), wireless networks (WiFi), the Internet, including the world wide web, cellular and/or other arrangements for enabling communication between the processing devices 102, in either real time or otherwise (e.g., via time shifting, batch processing, etc.).

A processing device 102 can be implemented as a server, personal computer, laptop computer, netbook computer, purpose-driven appliance, special purpose computing device and/or other device capable of communicating over the network 104. Other types of processing devices 102 include for example, personal data assistant (PDA) processors, palm computers, cellular devices including cellular mobile telephones and smart telephones, tablet computers, an electronic control unit (ECU), a display of the industrial vehicle, a multi-mode industrial management badge, etc.

Still further, a processing device 102 is provided on one or more industrial vehicles 108 such as a forklift truck, reach truck, stock picker, automated guided vehicle, turret truck, tow tractor, rider pallet truck, walkie stacker truck, etc. In the example configuration illustrated, the industrial vehicles 108 wirelessly communicate through one or more access points 110 to a corresponding networking component 106, which serves as a connection to the network 104. Alternatively, the industrial vehicles 108 can be equipped with WiFi, cellular or other suitable technology that allows the processing device 102 on the industrial vehicle 108 to communicate directly with a remote device (e.g., over the networks 104).

The illustrative system 100 also includes a processing device implemented as a server 112 (e.g., a web server, file server, and/or other processing device) that supports an analysis engine 114 and corresponding data sources (collectively identified as data sources 116).

In an exemplary implementation, the data sources 116 include a collection of databases that store various types of information related to an operation (e.g., a warehouse, distribution center, retail store, manufacturer, etc.). However, these data sources 116 need not be co-located. In the illustrative example, the data sources 116 include databases that tie processes executing for the benefit of the enterprise, from multiple, different domains. In the illustrated example, data sources 116 include an industrial vehicle information database 118 (supporting processes executing in an industrial vehicle operation domain), an industrial management system (e.g., a warehouse management system (WMS)) 120 (supporting processes executing in WMS domain that relate to movement and tracking of goods within the operating environment), a human resources management system (HRMS) 122 (supporting processes executing in an HRMS domain), a geo-feature management system 124 (supporting processes that utilize environmental-based location tracking data of industrial vehicles in a geo-domain), etc. The above list is not exhaustive and is intended to be illustrative only.

Still further, the illustrative system 100 includes processing devices implemented as electronic badges 126. The electronic badges 126 can be mobile badges, e.g., installed on workers, vehicles, etc. Electronic badges 126 can also be positioned on machines, fixtures, equipment, building structures, etc., as will be described in greater detail herein.

In this regard, this application incorporates by reference, U.S. Provisional Patent Application No. 62/354,220, titled "INDIRECT ELECTRONIC BADGE TRACKING"; U.S. Provisional Patent Application No. 62/354,235, titled "USE OF ELECTRONIC BADGES IN AISLE PASSING MANEUVER"; U.S. Provisional Patent Application No. 62/354,281, titled "ELECTRONIC BADGE AS A TALKING MARKER"; and U.S. Provisional Patent Application No. 62/354,304, titled "ELECTRONIC BADGE TO AUTHENTICATE AND TRACK INDUSTRIAL VEHICLE OPERATOR", all filed Jun. 24, 2016, the disclosures of which are incorporated by reference in their entirety. Here, capabilities of the badges described in the above provisional applications are extended with the hardware and software of FIGS. 3 and 4 to handle observational feedback as set out more fully herein.

In certain illustrative implementations, the industrial vehicles 108 themselves can communicate directly with each other via electronic badge communicator technology, e.g., via a short-range direct communication link, thus forming a mesh network, or temporary mesh network.

One or more of the industrial vehicles 108 can also include an optional environmental-based location tracking device that works with a location tracking system schematically represented by 128, which allows position determination of the industrial vehicle 108, even when operating indoors where a traditional global positioning system (GPS) is ineffective. As will be described in greater detail herein, environmental-based location tracking can be utilized to effectively map and track the location of an industrial vehicle 108 in a dimensionally constrained environment, e.g., a mapped indoor portion of an industrial enterprise (e.g., a warehouse, a manufacturing plant, etc.).

The analysis engine 114 and data sources 116 provide domain-level resources to the processing devices, including processing devices 102, industrial vehicles 108, and electronic badges 126. Moreover, the data sources 116 store data related to activities of the industrial vehicles 108 and electronic badges 126, including the storage of information regarding captured events, industrial vehicle and pedestrian encounters with electronic badges and geo-features, combinations thereof, etc.

Industrial Vehicle

Figure 2:
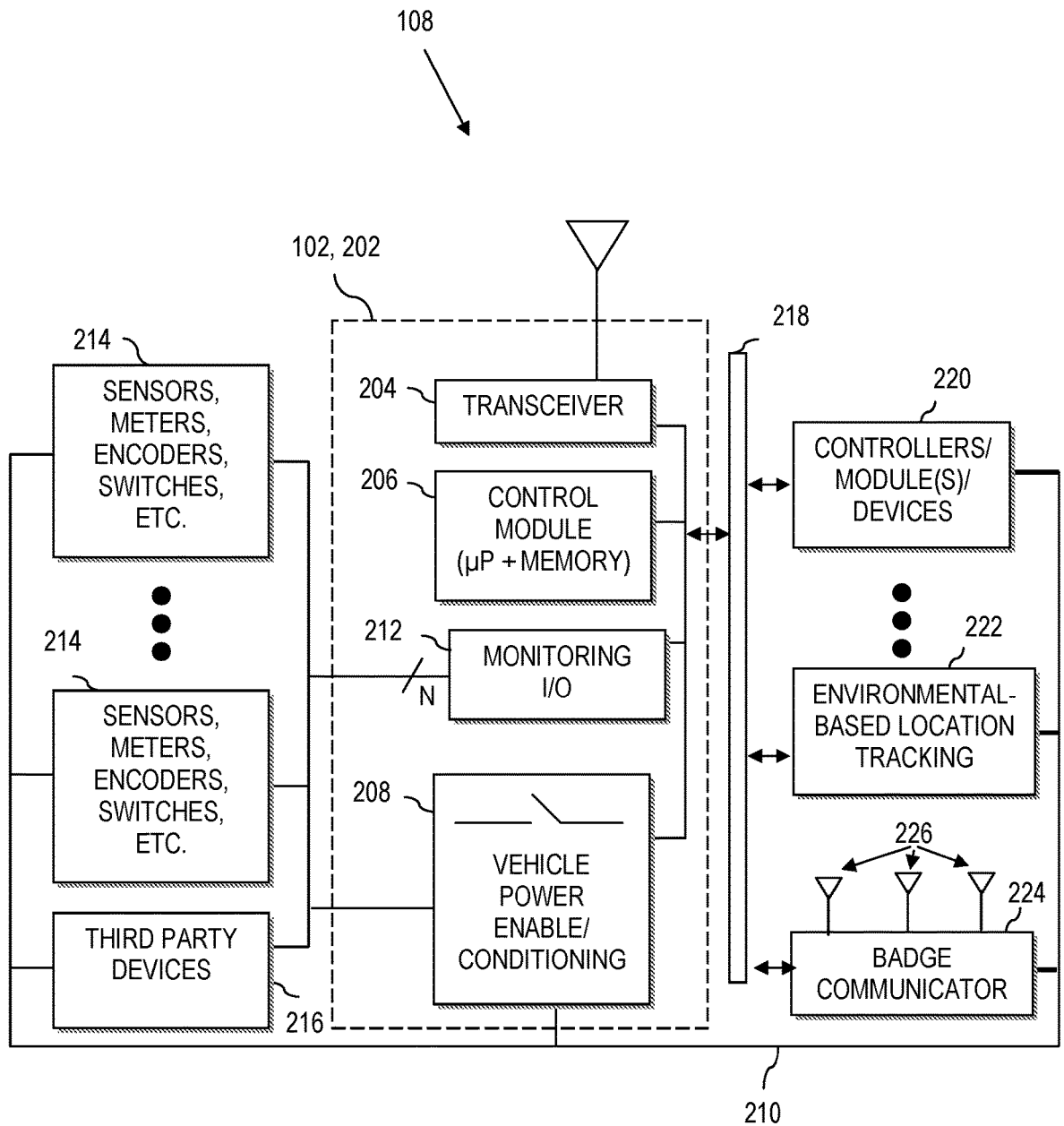
FIG. 2 is a block diagram of a system of electronics on an industrial vehicle such as a forklift truck, which includes an information linking device, an environmental-based location tracking device, and a badge communicator, according to aspects of the present disclosure.

Referring to FIG. 2, one or more industrial vehicles 108 include a processing device 102 that is implemented as a special purpose, particular computer, (further designated herein as an information linking device 202) that mounts to or is otherwise integrated with the industrial vehicle 108 (FIG. 1).

The information linking device 202 comprises the necessary circuitry to implement wireless communication, data and information processing, and wired (and optionally wireless) communication to components of the industrial vehicle 108, with the server 112 (FIG. 1) via access points 110 (FIG. 1), and with electronic badges 126 (FIG. 1). As a few illustrative examples, the information linking device 202 includes a transceiver 204 for wireless communication. Although a single transceiver 204 is illustrated for convenience, in practice, one or more wireless communication technologies may be provided. For instance, the transceiver 204 communicates with a remote server, e.g., server 112 of FIG. 1, via 802.11.xx across the access points 110 of FIG. 1. The transceiver 204 may also optionally support other wireless communication, such as cellular, Bluetooth, infrared (IR), ultra-wide band (UWB), or any other technology or combination of technologies. For instance, using a cellular to IP bridge the transceiver 204 can use a cellular signal to communicate directly with a remote server, e.g., a manufacturer server across a network 104 (FIG. 1).

The information linking device 202 also comprises a control module 206, having a processor coupled to memory for implementing computer instructions, including computer-implemented processes, or aspects thereof, as set out and described more fully herein. The control module 206 communicates with the components set forth in FIG. 2 described more fully herein making the information linking device 202 a particular machine different from a general-purpose computer. For instance, the control module 206 utilizes the transceiver 204 to exchange information with the remote server 112 (FIG. 1) for controlling operation of the industrial vehicle 108, for remotely storing information extracted from the industrial vehicle 108, etc.

The information linking device 202 further includes power enabling circuitry 208 controlled by the control module 206 to selectively enable or disable the industrial vehicle 108 (or alternatively, to selectively enable or disable specific control modules or vehicle functions such as hydraulic, traction, etc.). For instance, the control module 206 can control the industrial vehicle power enabling circuitry 208 to provide power to the industrial vehicle 108, to provide power to select components of the industrial vehicle 108, to provide power for select vehicle functions, etc. via power line 210, e.g., based upon operator login, detected geo-features, etc.

Still further, the information linking device 202 includes a monitoring input output (I/O) module 212 to communicate via wired or wireless connection to peripheral devices attached to or otherwise mounted on the industrial vehicle 108, such as sensors, meters, encoders, switches, etc. (collectively represented by reference numeral 214). The module 212 may also be connected to other devices, e.g., third party devices 216 such as RFID scanners, displays, meters or other devices. This allows the control module 206 to obtain and process information monitored on the industrial vehicle 108.

The information linking device 202 is coupled to and/or communicates with other industrial vehicle system components via a suitable vehicle network bus 218. The vehicle network bus 218 is any wired or wireless network, bus or other communications capability that allows electronic components of the industrial vehicle 108 to communicate with each other. As an example, the vehicle network bus 218 may comprise a controller area network (CAN) bus, Local Interconnect Network (LIN), time-triggered data-bus protocol (TTP) or other suitable communication technology.

As will be described more fully herein, utilization of the vehicle network bus 218 enables seamless integration of the control module 206 and other components of the information linking device 202 into native electronics of the industrial vehicle 108. In the example configuration, the control module 206 of the information linking device 202 connects with, understands and is capable of communication with native vehicle electronic components, such as traction controllers, hydraulic controllers, modules, devices, bus enabled sensors, displays, lights, light bars, sound generating devices, headsets, microphones, haptic devices, etc. (collectively referred to by reference 220).

Environmental-Based Location Tracking

According to yet further aspects of the present disclosure, an environmental-based location tracking device 222 is provided on the industrial vehicle 108. As illustrated, the environmental-based location tracking device 222 is connected to the vehicle electronics via the vehicle network bus 218 (e.g., CAN bus). As a result, the environmental-based location tracking device 222 can communicate directly with the control module 206, as well as other devices linked to the vehicle network bus 218 of the corresponding industrial vehicle 108. The environmental-based location tracking device 222 enables the industrial vehicle 108 to be spatially aware of its location within a dimensionally constrained environment, e.g., a mapped portion of an industrial enterprise.

In the applications described more fully herein, a conventional technology such as a global positioning system (GPS) is not likely to be effective when the industrial vehicle 108 is operated indoors. However, the environmental-based location tracking device 222 can comprise a local awareness system that utilizes markers, including fiducial markers, RFID, beacons, lights, or other external devices to allow spatial awareness within the industrial (e.g., warehouse, manufacturing plant, etc.) environment. Moreover, local awareness can be implemented by machine vision guidance systems, e.g., using one or more cameras. The environmental-based location tracking device 222 may also/alternatively use transponders and triangulation calculations to determine position. Yet further, the environmental-based location tracking device 222 can use combinations of the above and/or other technologies to determine the current (real-time) position of the industrial vehicle 108. As such, the position of the industrial vehicle 108 can be continuously ascertained (e.g., every second or less) in certain implementations. Alternatively, other sampling intervals can be derived to continuously (e.g., at discrete defined time intervals, periodic or otherwise constant and recurring time intervals, intervals based upon interrupts, triggers or other measures) determine industrial vehicle position over time.

The environmental-based location tracking device 222 can also use knowledge read from inertial sensors, vehicle sensors, encoders, accelerometers, gyroscopes, etc., (e.g., via the controllers 220 across the vehicle network bus 218, via sensors 214 and/or third party devices 216 across the monitoring I/O 212 and vehicle network bus 218, etc.) to determine the position of the industrial vehicle 108 within the industrial enterprise and/or to augment or modify the position determination from the location tracking device 222.

The environmental-based location tracking device 222 is aware of the absolute position of the industrial vehicle 108 within a dimensionally limited environment, e.g., a mapped portion of an industrial enterprise. By "absolute" position, it is meant that the vehicle position is known relative to a map. The map may be a regional area, e.g., only a portion of an indoor facility such as a warehouse. Absolute position is to be differentiated from relative offset position. A relative offset position can be a general description of an offset distance, e.g., two meters away, without also knowing the direction of the offset. Alternatively, the relative offset position can be a general description of a direction without a distance, e.g., towards the power unit of the industrial vehicle 108, without knowing the precise distance. In other examples, the relative offset position can be a precise measure of both offset and direction, two meters away in direction X, Y, Z. In this situation, orientation or a standardized reference plane should be established to ensure that offset position is accurately translated to absolute position, and vice-versa. In certain illustrative implementations, the absolute position of the industrial vehicle may be known, but orientation may be unknown. In other implementations, orientation and absolute position are known.

Badge Communicator

The information linking device 202 also communicates with a badge communicator 224. The badge communicator 224 includes a transceiver for short range communication with suitably configured electronic badges (e.g., electronic badge 126 of FIG. 1) in the vicinity of the badge communicator 224, e.g., by way of non-limiting example, in the range of about 15-20 meters or less. The badge communicator 224 can communicate using any proprietary or standardized communication protocol including Bluetooth (over IEEE 802.15.1), ultra-wideband (UWB, over IEEE 802.15.3), ZigBee (over IEEE 802.15.4), Wi-Fi (over IEEE 802.11), WiMax (over IEEE 802.16), etc.

In certain illustrative implementations, the electronic badges are to be worn by pedestrians, workers, industrial vehicle operators, etc. Moreover, electronic badges can be mounted to mobile equipment, industrial vehicles, or other moving objects. As such, electronic badges are also referred to herein as mobile badges when used in the context of an electronic badge that is not anticipated to remain stationary. On the other hand, certain electronic badges may be stationary, such as where mounted to the end of an aisle, on racking, above doorways, near breakrooms, or in other situations where the electronic badge is not intended to move. As such, electronic badges are also referred to herein as fixed/stationary badges when used in the context of an electronic badge that is anticipated to remain stationary.

In certain illustrative implementations, the badge communicator 224 includes at least three antennae 226. The availability of multiple antennae allows not only signal detection, but also positioning within the detection region. Here, the badge communicator 224 computes position via time of flight calculations, phase calculations, received signal strength calculations, time difference of arrival, trilateration, multilateration, and/or other techniques that can be used to determine the direction of the communication with a corresponding electronic badge 126 (FIG. 1). In practice, the antennae 226 can each communicate with the badge communicator 224 across the vehicle network bus 218, thus allowing flexibility in the placement of the antennae on the industrial vehicle 108, which can include placement remote from the badge communicator 224 itself. For instance, each antenna 226 can be mounted on an overhead guard, power unit, work assist bar, structural component, pole, etc. Moreover, each antenna 226 can be mounted on a different location/structure of the industrial vehicle.

As illustrated, the badge communicator 224 is connected to the vehicle electronics via the vehicle network bus 218 (e.g., CAN bus). As a result, the badge communicator 224 can communicate directly with the control module 206, as well as controllers and other modules 220 of the corresponding industrial vehicle 108. Thus, the badge communicator 224 can pass information related to the detection of proximate electronic badges 126 to the control module 206 of the information linking device 202. The control module 206 of the information linking device 202 can then process the received information related to the detection of proximate electronic badges 126, send commands to vehicle controllers and modules 220, take action based upon a known location of the industrial vehicle 108 via information collected from the environmental-based location tracking device 222, pass information back to the badge communicator 224, communicate the collected information to a remote server (e.g., server 112 of FIG. 1), take action based upon information received from the remote server, combinations of thereof, etc.

In yet further configurations, an electronic badge 126 (or equivalent functions thereof) can be added to the industrial vehicle, integrated into the badge communicator 224, etc. This allows the industrial vehicle 108 to broadcast an ID to other badge communicators nearby, and to initiate communications through the local communications capabilities of the badge communicator 224.

Example Electronic Badge

Figure 3:
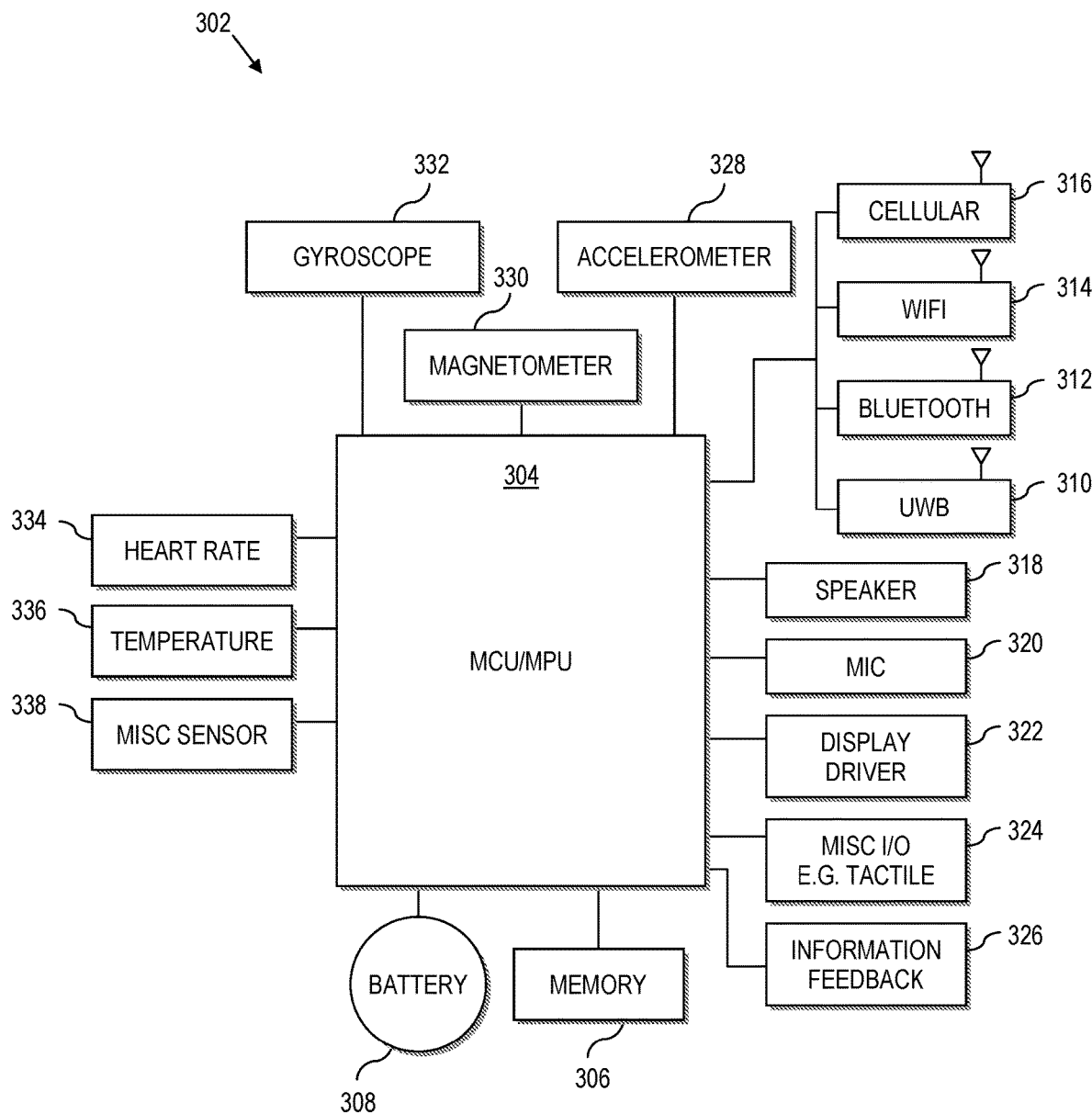
FIG. 3 is a block diagram of an example electronic badge according to aspects of the present disclosure.

Referring to FIG. 3, a multi-mode electronic badge 302 is illustrated according to aspects of the present disclosure. The electronic badge 302 can be utilized to implement the badge 126 set out more fully herein. In practical implementations, the electronic badge 126 may be a stand-alone electronic badge or an electronic badge as part of a system including a case augmenting the functions and hardware of a stand-alone electronic badge, as described below.

The electronic badge 302 includes a controller (MCU/MPU) 304 having a processor coupled to memory 306. The memory 306 stores program code that causes the badge 302 to communicate with other badges 302, corresponding badge communicators, the server 112 (FIG. 1), combinations thereof, etc., as described more fully herein. The processor of the controller 304 also executes code in the memory 306 to read sensor data, to interact with input/output, etc. In this regard, the memory 306 further stores sensor data at least until such data is communicated out for storage, e.g., by server 112 (FIG. 1). Further, the memory 306 may store various programs and applications that instruct the processor to perform certain functions, as described in greater detail herein, such that the badge is a particular machine different from a general-purpose computer.

The badge 302 also includes a battery 308 to power the badge 302. In this regard, the schematic representation of the battery 308 is intended to include a battery, and/or a battery along with battery management circuitry, e.g., to conserve power, and perform other battery management functions.

The badge 302 also includes at least one wireless transceiver coupled to the controller 304 for wireless communication. At least one wireless transceiver can be compatible with the badge communicator 224 on the industrial vehicle 108 (FIG. 2). For instance, for clarity of discussion, the illustrated badge 302 includes a first transceiver (e.g., an ultra-wide band transceiver 310) for wireless communication across a temporary personal-area network. Further, the illustrated badge 302 includes a second transceiver (e.g., a Bluetooth transceiver 312) to communicate over a second personal-area network, a third transceiver (e.g., a wireless fidelity (WiFi) transceiver 314) for wireless communication over a wireless local-area network, and a fourth transceiver (e.g., a cellular transceiver 316) for communication over a cellular network. In practice, a badge 302 can include any combination of transceivers identified above and/or transceivers that operate using alternative schemes.

In some instances, the two personal-area networks (e.g., UWB and Bluetooth) may be used in conjunction to create a zone around the electronic badge. For example, the first personal-area network (e.g., UW/B) may have a larger operational radius than the second personal-area network (e.g., Bluetooth). Thus, the zone may include an outer perimeter based on the first personal-area network and an inner perimeter based on the second personal-area network.

Moreover, the badge 302 includes input and/or output devices, e.g., a speaker 318, a microphone 320, a display driver 322, other I/O devices 324 (e.g., tactile device, haptic output, camera, etc.), information feedback device 326, etc., or combinations thereof. As a further example, an input device can comprise a device analogous to the environmental-based location tracking device (222, FIG. 2).

In an illustrative example, the information feedback device 326 is implemented as an LED (light-emitting diode) indicator 326, which illuminates to communicate with the associated user. For instance, the device can illuminate when the pedestrian is in a predefined zone, in proximity to another badge or badge communicator 224 on an industrial vehicle 108, or to indicate that a message/feedback is available for the user. As another example, an LED indicator may indicate when observational feedback has been sent or received, as explained in greater detail below.

The example badge 302 also includes at least one inertial sensor coupled to the controller 304. For instance, as illustrated, there are three inertial sensors, including an accelerometer (e.g., three-axis accelerometer) 328, a magnetometer 330, and a gyroscope (e.g., a three-axis gyroscope) 332. The accelerometer 328 measures physical acceleration. Comparatively, the gyroscope 332 measures angular velocity. The magnetometer 330 acts as a compass, which is useful to determine orientation. In practice, a badge 302 need not include all three inertial measurement technologies.

Yet further, additional sensors can be coupled to the badge 302. For sake of illustration, the badge 302 also includes a heart rate sensor 334 coupled to the controller 304 to capture the measured heart rate of the individual wearing the badge 302. Moreover, an optional temperature sensor 336 can be coupled to the controller 304 to capture the measured body temperature of the individual wearing the badge 302 or to capture an ambient temperature. In practice, other sensor technologies 338 (e.g., barometer, humidity sensor, pedometer, etc.) can also and/or alternatively be integrated into the badge. As such, the electronic badge 126, 302 can be used as a physical tracker, counting the number of steps that the vehicle operator, order picker, or other industrial worker tasks. The electronic badge 126 (FIG. 1), 302 can also detect a number of times the user bends, climbs stairs, etc. Further, the mobile electronic badge 126 (FIG. 1), 302 can also keep track of the time while the operator is off the industrial vehicle 108, e.g., time walking, carrying loads, etc.

In certain implementations, the electronic badge 126 (FIG. 1), 302 can be a hand-held mobile device, such as a smart phone, tablet, palm computer, etc. For instance, a smartphone provides a convenient badge because the typical smartphone already includes a display, speaker, accelerometer, processor, compass, etc. Moreover, most smart phones include or can be equipped with Bluetooth, UWB, WiFi, cellular, and other radio technologies. Yet further, smart phones facilitate rich integration by adding GPS, direct communication with a server. Thus, the electronic badge 302 may have a housing with a form factor of a mobile device.

In other implementations, the electronic badge 126 (FIG. 1), 302 can be a hand-held portable device, such as a smart phone, tablet, palm computer, etc. used in conjunction with a case, as described in greater detail herein. In implementations with a case, some of the functionality described above may be implemented in the case (e.g., ultra-wide band transceiver, improved speakers, improved microphone, additional battery, additional storage, etc., to augment the capability of a conventional smartphone to define the badge, as described in greater detail herein.

Applications

Figure 4:
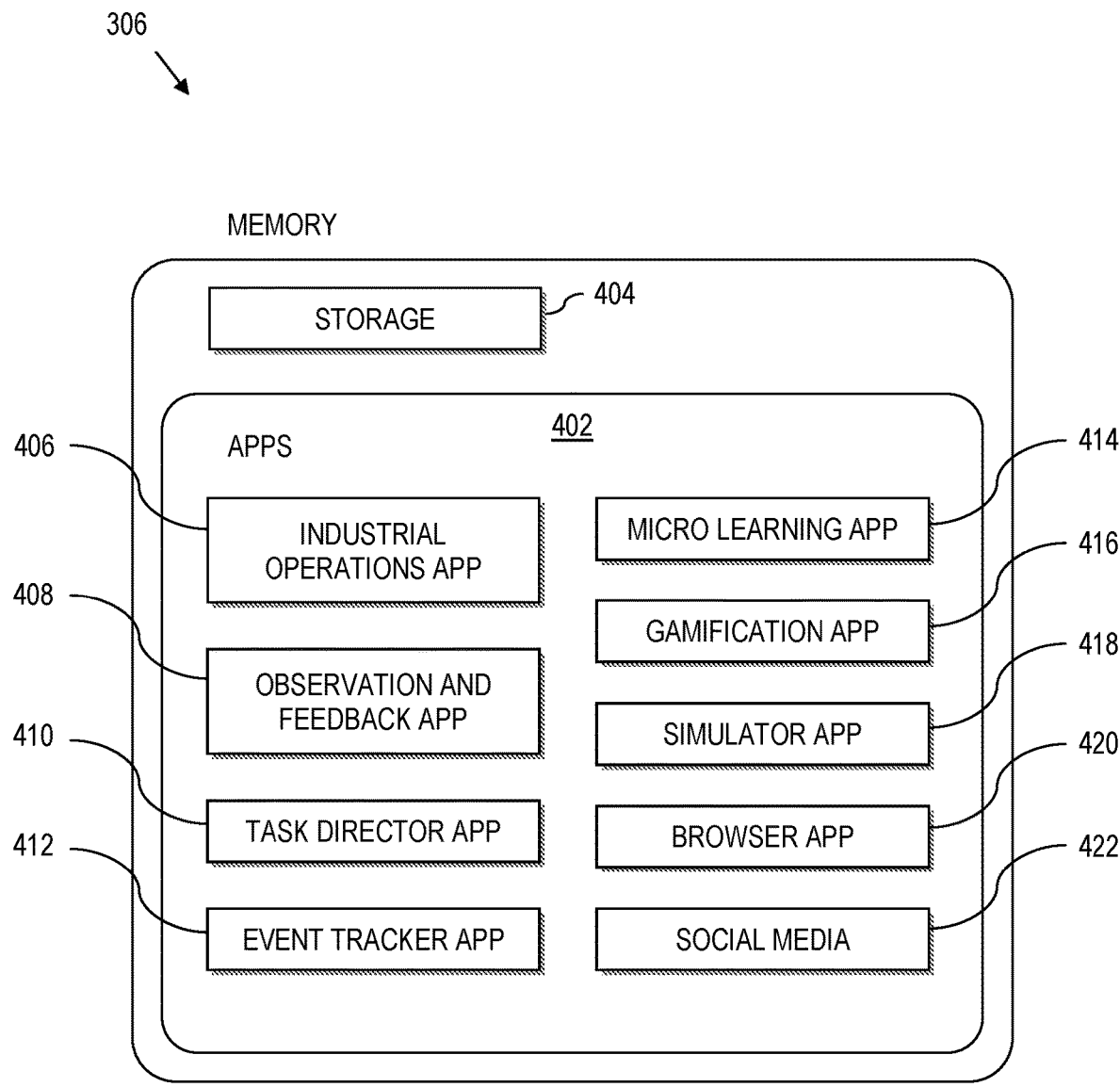
FIG. 4 is a block diagram illustrating a memory of the electronic badge of FIG. 3, according to various aspects of the present disclosure.

Referring now to FIG. 4, as described above the memory 306 of the electronic badge includes program code 402 for instructing the processor to perform various functions and a storage space 404 for storing other data (e.g., sensor data, industrial vehicle information, etc.). For example, the storage space 404 may be used to store an identification of a user associated with the electronic badge, event records, logs, etc. Example applications that can be stored in the program code are described below.

Industrial Operations Application

In an illustrative implementation, a first program is an industrial operations application 406 that is used to programmably set an operating mode of the badge as that of a pedestrian or vehicle operator. For instance, the industrial operations application 406 can determine whether the electronic badge is communicably coupled to an industrial vehicle via a transceiver of the electronic badge. By way of illustration, as will be discussed in greater detail herein, the electronic badge can rest in a cradle of an industrial vehicle and link to the industrial vehicle via wireless transceiver or through a physical connection in the cradle. In this configuration, the electronic badge automatically reconfigures to operate as a vehicle and/or vehicle operator electronic badge. This enables the electronic badge to integrate with industrial vehicle functions, e.g., to operate as a device connected to the information linking device 202 of FIG. 2.

In an example implementation, if it is determined that the electronic badge is not coupled to an industrial vehicle, then the badge will function in a first mode associated with a pedestrian (i.e., pedestrian mode). For example, upon initial startup such as at the start of a shift, a worker will likely retrieve the electronic badge from a storage/charging station where the battery 308 is being recharged, e.g., in a break-room, locker room, etc. Even if the worker is an industrial vehicle operator, the worker must first walk to the associated industrial vehicle. In this regard, the electronic badge can initially default to pedestrian mode.

While in the pedestrian mode, the electronic badge may count steps taken by the user, count a number of times the user bends over to lift something, determine whether the user properly lifted (e.g., with knees, not with back), give proper procedure for tasks that the user must take, etc.

If it is determined that the electronic badge is coupled to an industrial vehicle, then the badge will function in a second mode associated with the industrial vehicle (i.e., industrial vehicle mode). For example, while in (or prior to entering) the industrial vehicle mode, the electronic badge may prompt the user to determine whether the electronic badge should be used to log the user onto the industrial vehicle. If not, then the electronic badge will revert (or remain in) to pedestrian mode. If the user wants to log onto the industrial vehicle, then the electronic badge remains in (or switches to) the industrial vehicle mode and logs the user onto the industrial vehicle using the identification of the user associated with the electronic badge stored in the storage 404 space of the memory 306. In other cases, the electronic badge will log the user onto the industrial vehicle when the electronic badge detects that it is in the cradle of the industrial vehicle without prompting the user.

Where a separate cradle is not provided, the badge communicator 224 on an industrial vehicle can detect that an operator has stepped onto an industrial vehicle. Communication between an electronic badge and a badge communicator 224 can toggle the electronic badge to the second mode.

Further, while in the industrial vehicle mode, the electronic badge may communicate with the industrial vehicle via a wireless transceiver or directly through a hardware link in the cradle. For example, the electronic badge may have access to sensor data, meter data, and other data available on the industrial vehicle. All or some of this data can be displayed on a display of the electronic badge. For example, if the electronic badge has access to speedometer data of the industrial vehicle, then the electronic badge may display the current speed of the industrial vehicle as a gauge (e.g., a virtual speedometer) on the display of the electronic badge. As another example, if the electronic badge has access to battery data of the industrial vehicle, then the electronic badge may display the current charge of the battery on the display of the electronic badge. Thus, the electronic badge may act as a secondary (or tertiary) display of the industrial vehicle while in industrial vehicle mode. The electronic badge can also serve as an ancillary display for task specific functions, such as for rack height select, or other task capabilities provided on the industrial vehicle.

Moreover, the electronic badge may switch between the two modes depending on whether the electronic badge is placed within the cradle of the industrial vehicle. For example, while in the industrial vehicle mode, the user stops and exits the industrial vehicle to place an item on the industrial vehicle. When doing so, the user removes the electronic badge and places the electronic badge in the user's pocket. At that point, the electronic badge will switch to pedestrian mode and perform actions within pedestrian mode (e.g., count a number of times the user bends over to pick up an item). When the user is finished and places the electronic badge back in the cradle, then the electronic badge will switch back to industrial vehicle mode.

The electronic badge may determine if the electronic badge is being removed or placed into the cradle in several ways. For example, there may be a specific signature of the accelerometer when removing/placing the electronic badge from/in the cradle. As another example, the electronic badge may know its position relative to a transceiver of the industrial vehicle, and when the electronic badge is at a certain point, it knows that it is in the cradle. Other methods may also be used.

Thus, a single device (i.e., the multi-mode electronic badges described herein) may be used as a pedestrian badge and an industrial vehicle badge/display.

Figure 5:
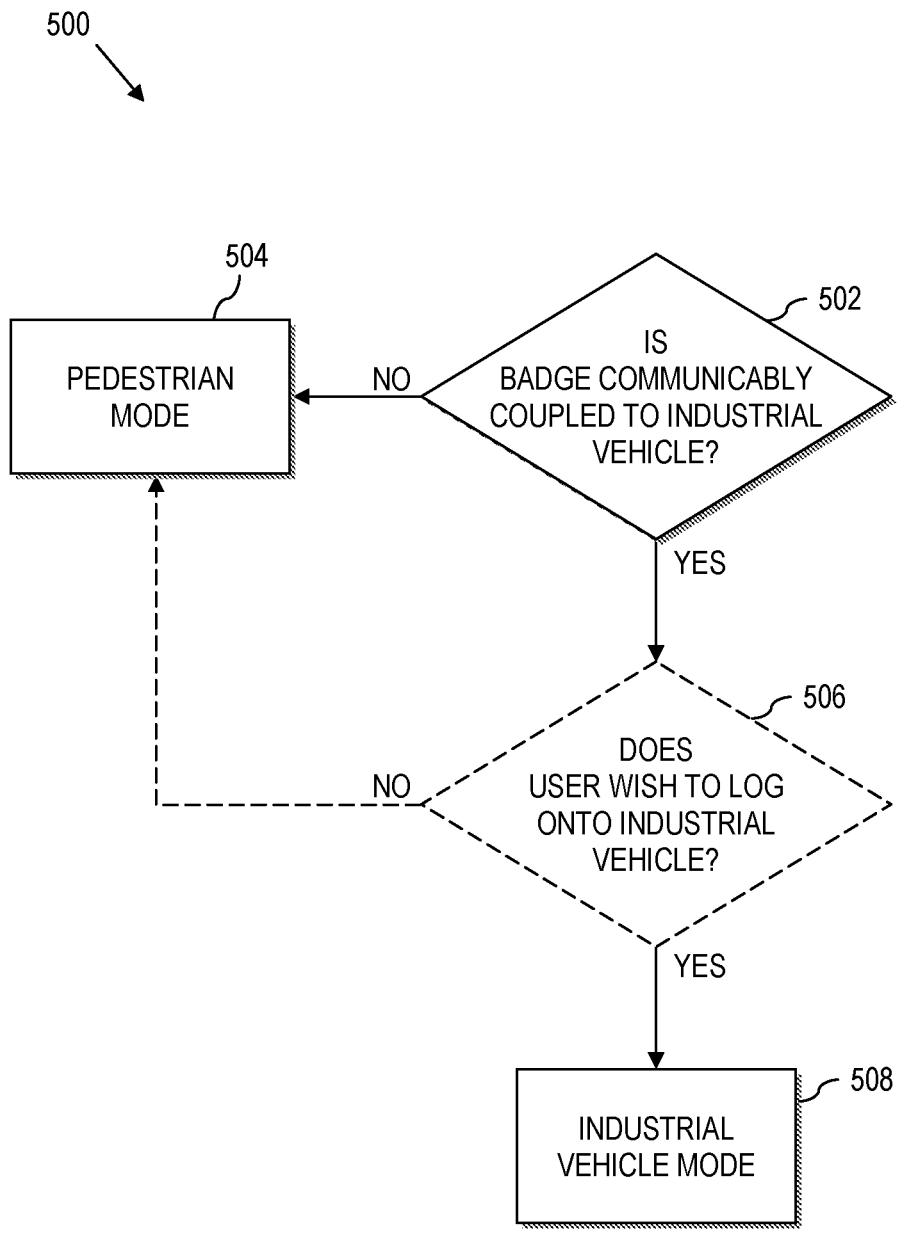
FIG. 5 is a flow chart illustrating an algorithm for determining whether the electronic badge of FIGS. 3-4 is in a pedestrian mode or an industrial vehicle mode, according to various aspects of the present disclosure.

With quick reference to FIG. 5, a flow chart is provided illustrating a simplified algorithm 500 for determining which mode to place the electronic badge. At 502, it is determined whether the badge is communicably coupled to an industrial vehicle. For example, the electronic badge may be coupled wirelessly (e.g., via UWB, Bluetooth, etc.) or with a wired interface (e.g., through a cradle on the industrial vehicle) to the vehicle network bus. If the electronic badge is not communicably coupled to the industrial vehicle, the electronic badge is placed (or remains) in pedestrian mode at 504.

However, if the electronic badge is communicably coupled to the industrial vehicle, then at optional 506, the user is prompted to indicate whether the electronic badge should log onto the industrial vehicle. If so, then the electronic badge is placed into industrial vehicle mode at 508. If not, then the electronic badge is placed (or remains) in pedestrian mode at 504.

If optional step 506 is not used, then if the electronic badge is communicably coupled to the industrial vehicle, the electronic badge is placed (or remains) into industrial vehicle mode at 508.

Observation and Feedback Application

Turning back to FIG. 4, a second illustrated program is an observation and feedback application 408. The observation and feedback application 408 utilizes personal-area networks to identify short-range encounters with other electronic badges. Encounters present an opportunity for the workers of the connected electronic badges to provide observational feedback. The observational feedback is used to send feedback to the other worker, to create event logs of observational information, to augment operational event logs with observational data, and for other event driven applications, as the situation dictates.

In an example implementation, the observation and feedback application 408 determines if the user sends or generates observational feedback to a second electronic badge associated with another user. Further, the observation and feedback application 408 can be utilized to determine whether observational feedback is received from another electronic badge associated with either another user, a fixed location marker badge, or from another device capable of interacting with the electronic badges. If feedback is sent or received, then an information feedback device (e.g., an LED (light-emitting diode)) is activated. For example, if positive observational feedback is received, then the information feedback device may be activated in a first mode (e.g., illuminate a green LED, provide a triumphant sound, display a message, combinations thereof, etc.). As a second example, if negative observational feedback is received, then the information feedback device may be activated in a second mode (e.g., illuminate a red LED, provide a non-triumphant sound, display a message, combinations thereof, etc.). As a third example, if it is determined that the user has sent observational feedback to another electronic badge, then the information feedback device may be activated in a third mode (e.g., illuminate an amber LED, flash an LED, etc.) to indicate that the feedback has been sent. In some instances, the information feedback device remains active until the information feedback device is deactivated based on an input from the user.

The observational feedback application 408 may be active when the electronic badge is in pedestrian mode or in industrial vehicle mode. Also, the observational feedback application 408 may automatically launch when an electronic badge is in proximity/range of another electronic badge.

Task Director Application

A third illustrated (optional) program is a task director application 410 that determines a task for the user. In an example configuration, the task director application 410 displays tasks on the display of the electronic badge. For example, the electronic badge may receive a schedule of tasks for the user from the server 112 (FIG. 1). As another example, the electronic badge may determine a task for the user based on an environmental-based location tracking system, from another nearby electronic badge, etc.

Event Tracker Application

A fourth illustrated (optional) program is an event tracker application 412. In certain implementations, the event tracker 412 can keep track of observational events generated, received, or both, by the electronic badge. In some implementations, the event tracker 412 can determine if observational feedback sent by the electronic badge or received by the electronic badge is proper, e.g., based on an environment of the user, based upon discoverable information using a transceiver of the electronic badge, based upon data gathered by the electronic badge, etc.

For example, if User_A observes that User_B used a proper technique when loading an industrial vehicle, User_A may send positive observational feedback to User_B. When User_A sends the observational feedback, the location of User_A's electronic badge and User_B's electronic badge are determined, and if User_A's electronic badge is within a predetermined threshold or range of User_B's electronic badge, the feedback is determined as proper.

On the other hand, if User_C is in a break room and his buddy, User_D, is across a warehouse and if User_C decides to give his buddy positive observational feedback, then the location of User_C's electronic badge and User_D's electronic badge are determined. It is then determined that User_C's electronic badge and User_D's electronic badge are too far apart for User_C to have seen User_D perform an action (i.e., the locations of the two devices are outside a predetermined range) and the observational feedback is marked as improper.

Further, other factors may be used to determine whether observational feedback is proper. For example, when observational feedback is sent, a task may be determined for the recipient of the observational feedback. If the task of the recipient is associated with the received observational feedback, then the feedback may be marked as proper. If not, then the feedback may be marked as improper.

As another example, when observational feedback is sent, an orientation of the sender's electronic badge may be determined (e.g., using the magnetometer) relative to the electronic badge of the recipient. If the orientation shows that the sender is facing away from the recipient, then the observational feedback may be marked as improper.

Other factors for determining whether observational feedback is proper exist, and each of the factors may be individually weighted in any desired manner.

Micro Learning Application

A fifth illustrated (optional) program is a micro learning application 414 that determines and/or provides context sensitive help. In example implementations, the micro learning application 414 provides context sensitive help based on a predetermined triggering action, such as a received observational feedback, an outcome from the event tracker application, from a task associated with the user, combinations thereof, etc. If context sensitive help is generated, the context sensitive help is output, e.g., displayed on the display of the electronic badge. For example, if a user receives negative observational feedback about not wearing gloves in a freezer, and if the observational feedback is determined to be proper, then the user's electronic badge may display information about wearing gloves whenever the user is in a freezer area.

Miscellaneous Applications

A sixth illustrated (optional) program is a gamification application 416 that provides games that can be accessed by the user. In an example implementation, the provided games are not related to functions of the electronic badge. In other example implementations, the games provided are related to micro learning, to received observational feedback, or other links. Further, the user's access to the games may be dependent on other factors such as the user's participation in observable feedback (e.g., did the user send proper observable feedback, did the user receive positive observable feedback, etc.). Regardless, the games are preferably time limited.

A seventh illustrated (optional) program is a simulator application 418. In an example implementation, the optional simulation application can be utilized for simulation based functions, e.g., to display a training simulation such as a virtual reality or augmented reality visualization to the user on a display of the electronic badge.

An eighth illustrated (optional) program is a browser application 420. In certain implementations, the browser is an Internet browser application. In certain implementations, the browser can also be configured to connect to local area networks, intranets, extranets, etc. in addition to or in lieu of connection to the Internet.

A ninth illustrated (optional) program is a social media application 422. In example implementations, the social media application 422 can connect with a social media server associated with an industrial management system. For example, if an industrial enterprise has a local social networking application specific to the enterprise, then the local social networking application may be displayed on the display of the electronic badge.

Other programs and applications may be present on the electronic badge.

Electronic Badge

Figure 6:
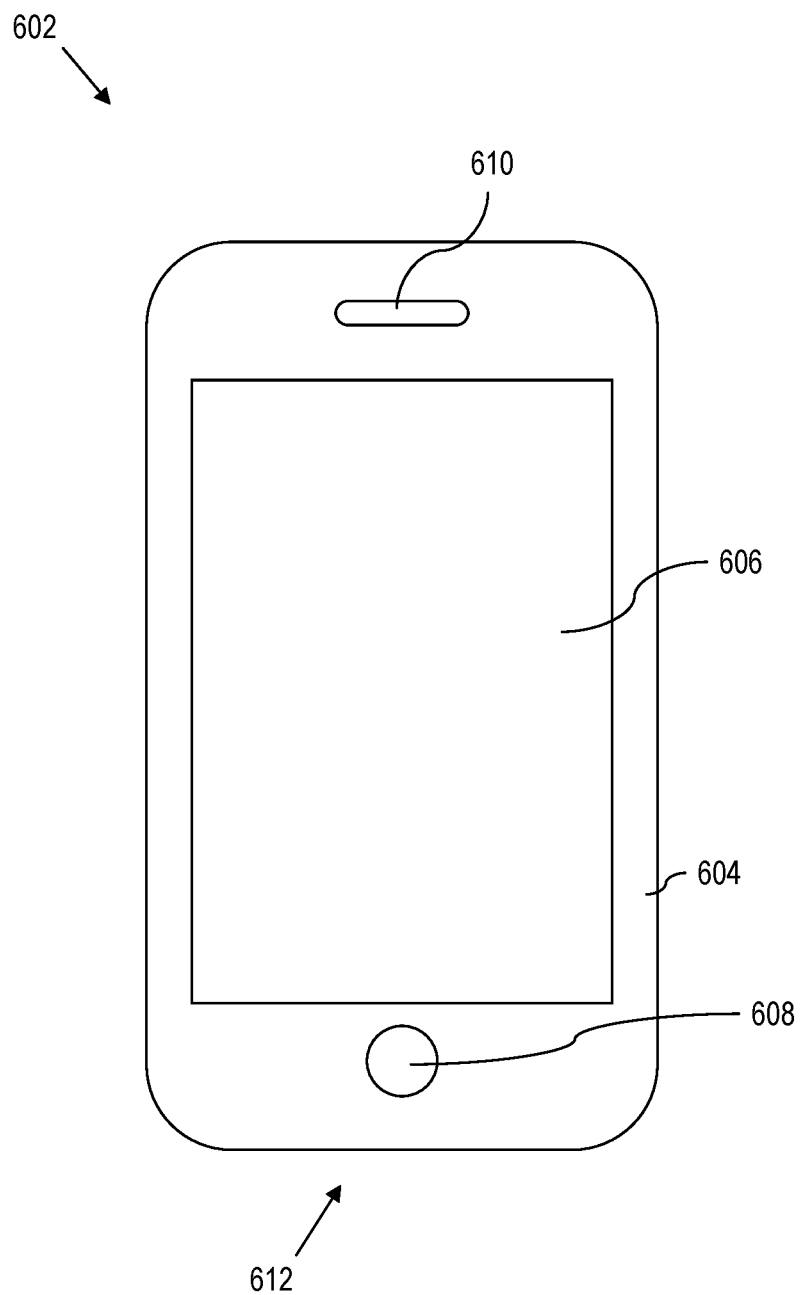
FIG. 6 is an illustration of an embodiment of the electronic badge of FIGS. 3-5, according to various aspects of the present disclosure.

FIG. 6 illustrates an embodiment of the electronic badge 602 discussed herein. The badge 602 can include a frame 604 that supports a display 606, an input 608, and a speaker, microphone or combination thereof 610. Further, the electronic badge 602 may include a housing 612 to house many of the components described herein (e.g., I/O, transceivers, sensors, etc. described more fully with regard to FIG. 3). For example, in this embodiment, a mobile phone may be used as the electronic badge 602. In such an instance, the electronic badge 602 can include one or more of the components of FIG. 3, and software of FIG. 4. The mobile phone need not have every feature of FIG. 3 and FIG. 4, depending upon the implementation.

A conventional portable electronic device does not have the features and capabilities of an electronic badge herein. In this regard, a portable electronic device, e.g., a smart phone, can be augmented with hardware to implement an electronic badge.

Figure 7:
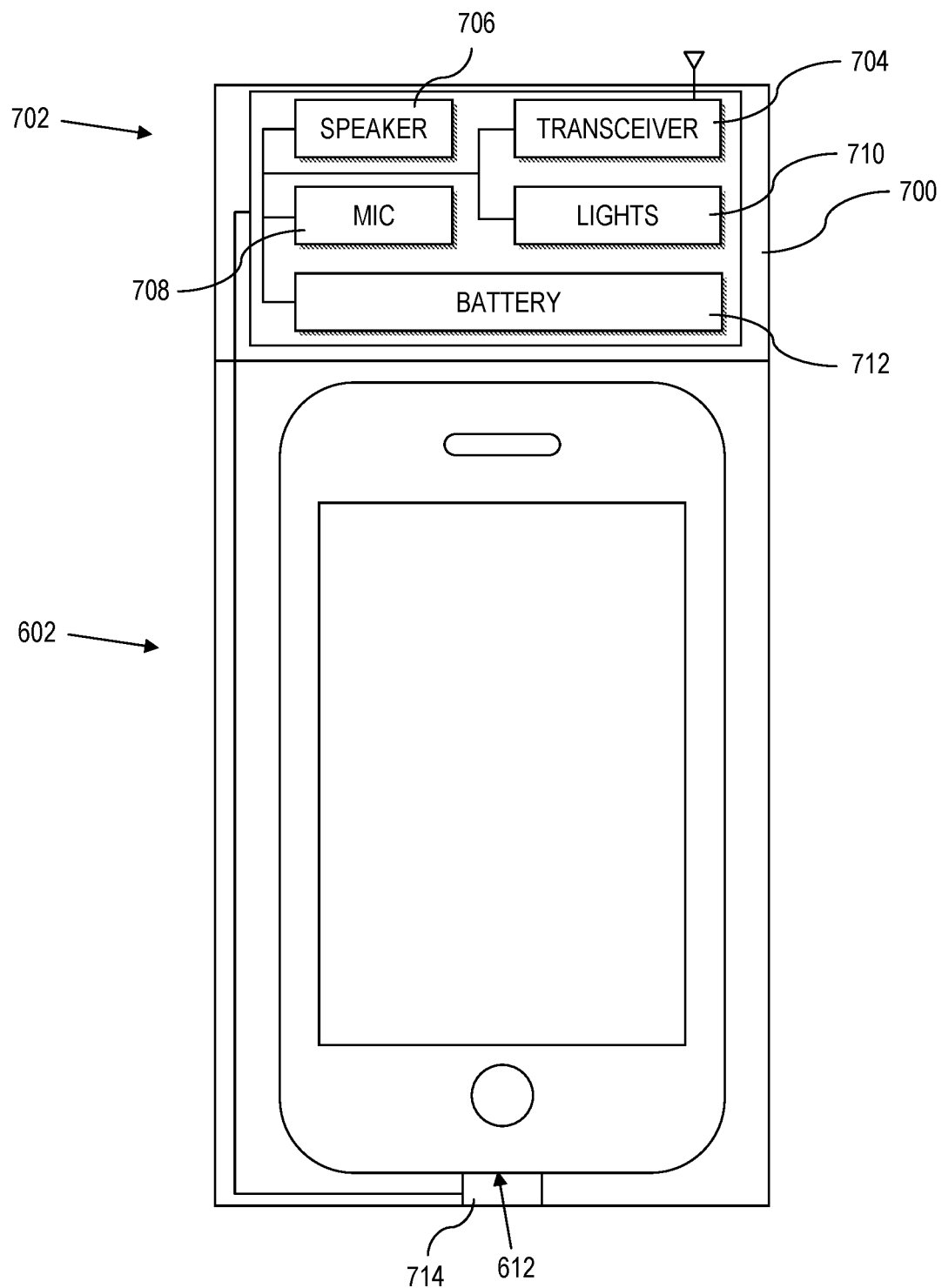
FIG. 7 is an illustration of an embodiment of the electronic badge of FIG. 6 attached to a case, according to various aspects of the present disclosure.

FIG. 7 illustrates the electronic badge 602 (FIG. 6) inserted into a frame 700 of a case 702 with augmented hardware. Thus, the electronic badge 602 is attachable to and detachable from the case 702.

For example, the case 702 includes a transceiver 704 (e.g., ultra-wide band, Bluetooth, etc.), a speaker 706, a microphone 708, an information feedback device 710, and a battery 712. Further, the transceiver 704 (or another transceiver) can be used to perform functions associated with the observational feedback as described herein. Also, the speaker 706 and microphone 708 can be used to augment the speaker and microphone on the mobile phone 602, e.g., to improve the ability to generate and receive observational feedback.

Moreover, the case 702 includes an electronic badge interface 714 that physically couples to the case interface 612 of the mobile device installed therein. Thus, the components (e.g., the transceiver 704, the speaker 706, the microphone 708, the information feedback device 710, and the battery 712) of the case 702 can communicate with the device 602 and vice versa.

In example implementations, the case 702 can include a battery 712, which is used to provide power to the electronic badge 602. In instances where the electronic badge 602 includes a primary battery, then the battery 712 of the case may act as a secondary battery that extends the operational capability of the primary battery. Also, the battery of the electronic badge 602 may provide power to the components of the case 702 and vice versa.

Figure 8:
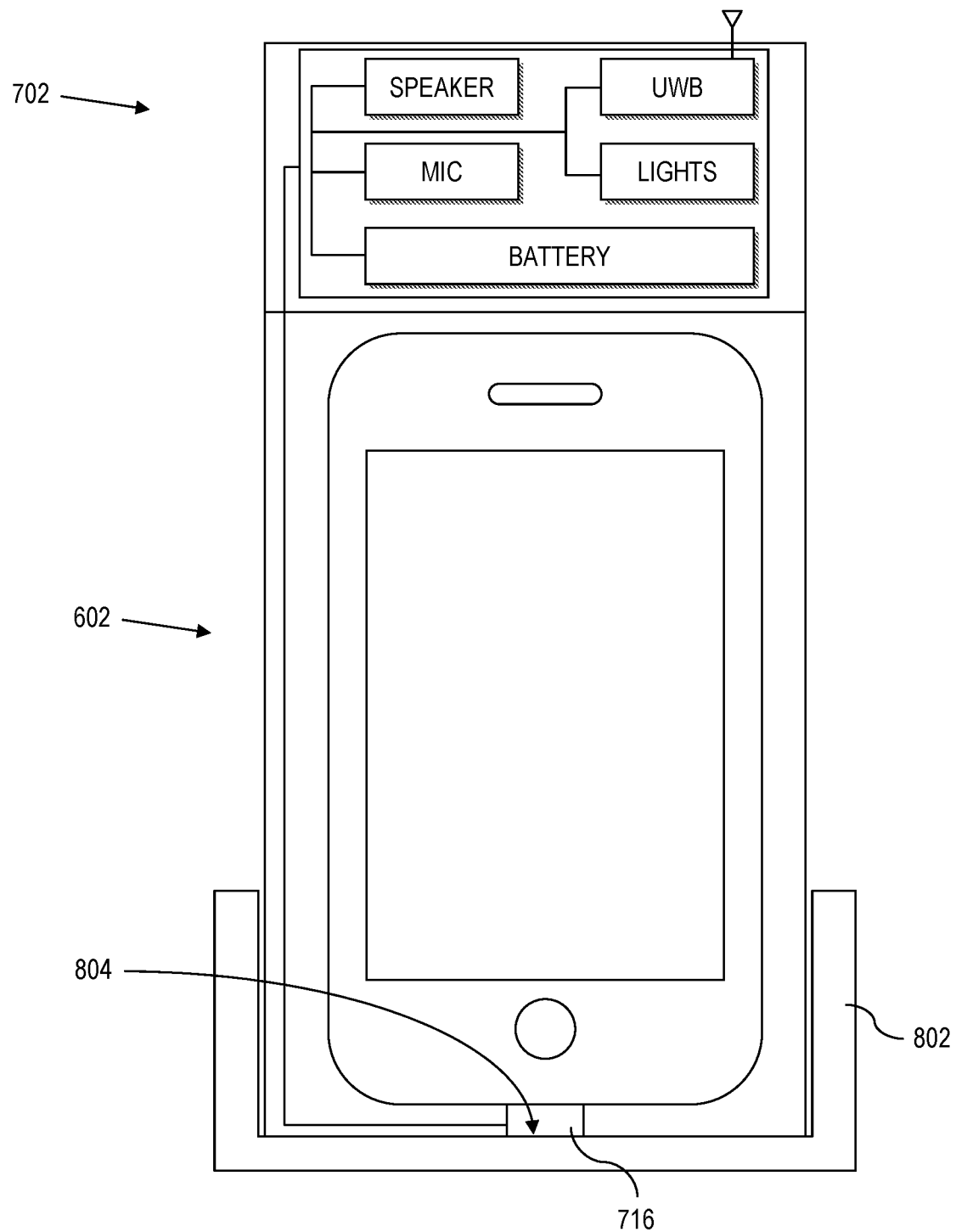
FIG. 8 is an illustration of an embodiment of the electronic badge of FIGS. 3-7 attached to the case of FIG. 7, which is attached to a cradle, according to various aspects of the present disclosure.

FIG. 8 illustrates the electronic badge 602 in a case 702 within a cradle 802 (e.g., coupled to an industrial vehicle), which may include a case interface 804 that couples to a cradle interface 716 of the case 702.

Figure 9:
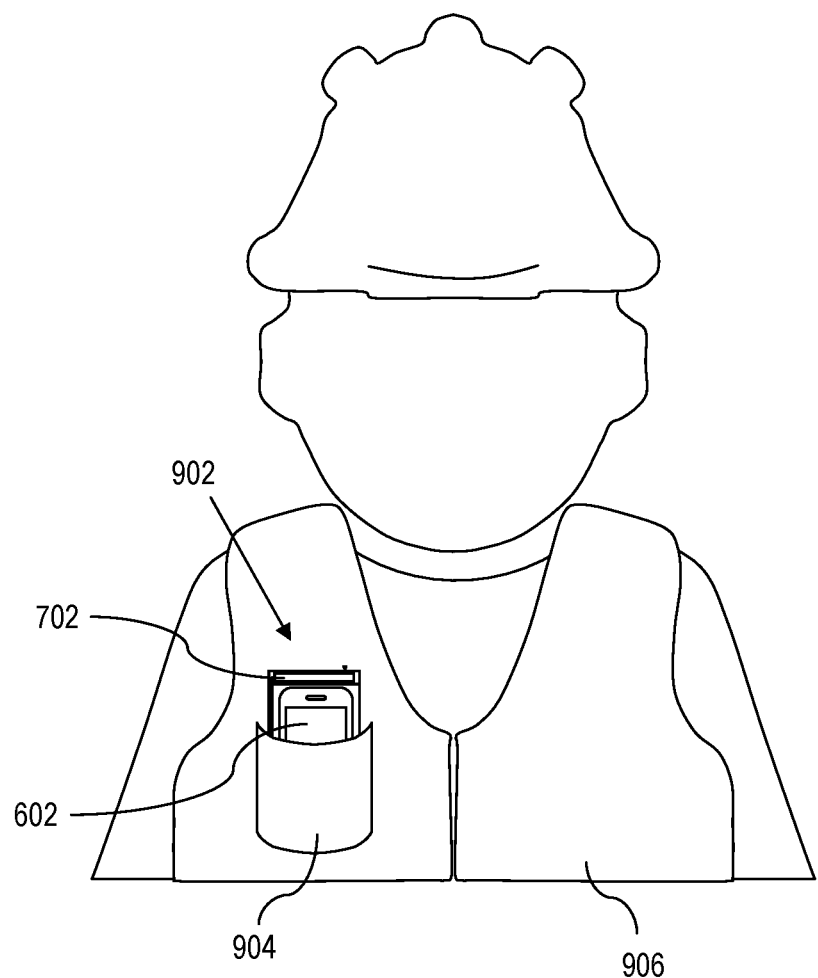
FIG. 9 is an illustration of the electronic badge system of FIG. 7 in a pocket of a vest of a pedestrian, according to various aspects of the present disclosure.

FIG. 9 illustrates use of the electronic badge system 902 (comprising the electronic badge 602 and the case 702) placed in a pocket 904 of a vest 906 and being used in pedestrian mode.

Figure 10:
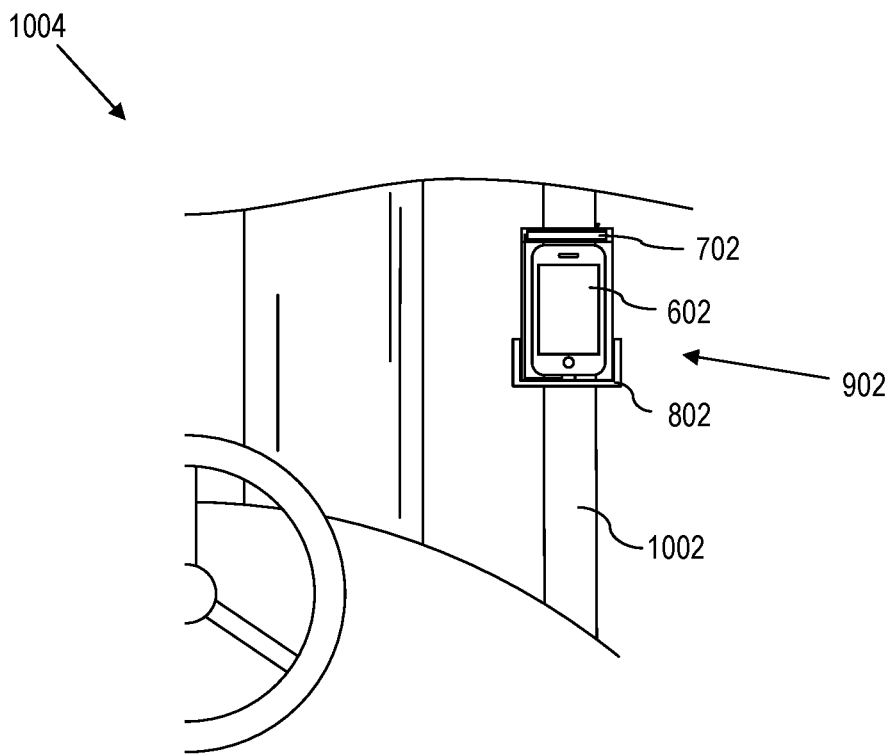
FIG. 10 is an illustration of the electronic badge system of FIG. 7 in a pocket of a cradle of an industrial vehicle, according to various aspects of the present disclosure.

FIG. 10 illustrates use of the electronic badge system 902 (comprising the electronic badge 602 and the case 702) placed in a cradle 802 coupled to a pole 1002 of an industrial vehicle 1004 and being used in the industrial vehicle mode, as described above. The industrial vehicle 1004 may supply power to the electronic badge system 902 via the case interface of the cradle and the cradle interface of the case. Further, the electronic badge system 802 may be communicably coupled to the industrial vehicle via hardware in the case/cradle interface or via a wireless transceiver, as discussed herein. Moreover, while in industrial vehicle mode, the display of the electronic badge may function as a gauge of the industrial vehicle (or otherwise be a secondary display of the industrial vehicle).

An example algorithm for determining whether the electronic badge system 902 is in pedestrian mode or industrial vehicle mode is illustrated in FIG. 5 (described above). Thus, the same badge may be used whether the user is a pedestrian or a vehicle operator. Further, the badge may be used in an observation and feedback program as described above.

Computer System Overview

Figure 11:
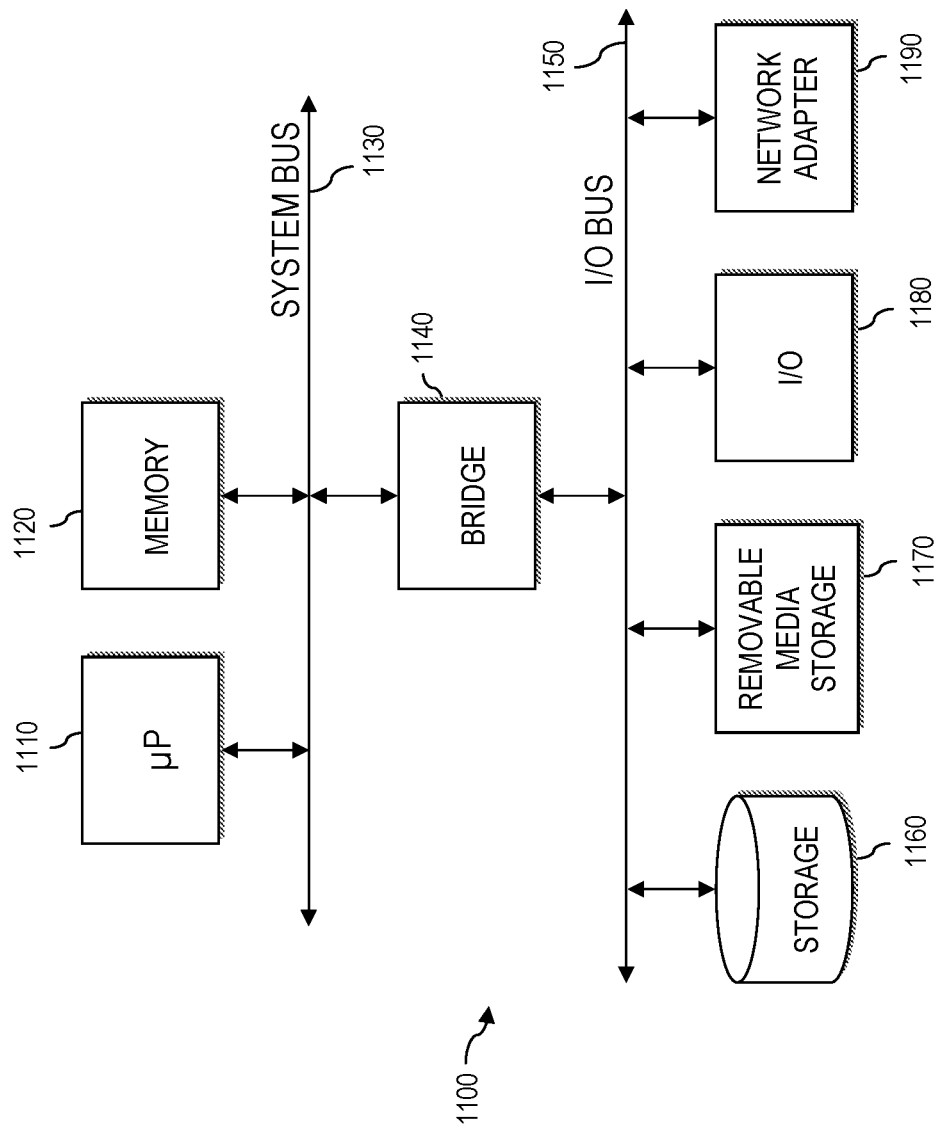
FIG. 11 is a block diagram of a computer processing system capable of implementing any of the systems or processes (or subsets thereof) described more fully herein.

Referring to FIG. 11, a schematic block diagram illustrates an exemplary computer system 1100 for implementing the various processes described herein. The exemplary computer system 1100 includes one or more (hardware) microprocessors (μP) 1110 and corresponding (hardware) memory 1120 (e.g., random access memory and/or read only memory) that are connected to a system bus 1130. Information can be passed between the system bus 1130 via a suitable bridge 1140 to a local bus 1150 that is used to communicate with various input/output devices. For instance, the local bus 1150 is used to interface peripherals with the one or more microprocessors (g) 1110, such as storage 1160 (e.g., hard disk drives); removable media storage devices 1170 (e.g., flash drives, DVD-ROM drives, CD-ROM drives, floppy drives, etc.); I/O devices 1180 such as input device (e.g., mouse, keyboard, scanner, etc.), output devices (e.g., monitor, printer, etc.); and a network adapter 1190. The above list of peripherals is presented by way of illustration, and is not intended to be limiting. Other peripheral devices may be suitably integrated into the computer system 1100.

The microprocessor(s) 1110 control operation of the exemplary computer system 1100. Moreover, one or more of the microprocessor(s) 1110 execute computer readable code (e.g., stored in the memory 1120, storage 1160, removable media insertable into the removable media storage 1170 or combinations thereof, collectively or individually referred to as computer-program products) that instructs the microprocessor(s) 1110 to implement the computer-implemented processes herein.

The computer-implemented processes herein may be implemented as a machine-executable process executed on a computer system, e.g., one or more of the processing devices 102, 126, etc., of FIG. 1, on a particular computing device such as the vehicle computer described with reference to FIG. 2, on the badges of FIGS. 3-4, or combination thereof.

Thus, the exemplary computer system or components thereof can implement processes and/or computer-implemented processes stored on one or more computer-readable storage devices as set out in greater detail herein. Other computer configurations may also implement the processes and/or computer-implemented processes stored on one or more computer-readable storage devices as set out in greater detail herein. Computer-program code for carrying out operations for aspects of the present disclosure may be written in any combination of one or more programming languages. The program code may execute entirely on the computer system 1100 or partly on the computer system 1100. In the latter scenario, the remote computer may be connected to the computer system 1100 through any type of network connection, e.g., using the network adapter 1190 of the computer system 1100.

In implementing computer aspects of the present disclosure, any combination of computer-readable medium may be utilized. The computer-readable medium may be a computer readable signal medium, a computer-readable storage medium, or a combination thereof. Moreover, a computer-readable storage medium may be implemented in practice as one or more distinct mediums.

A computer-readable signal medium is a transitory propagating signal per se. A computer-readable signal medium may include computer readable program code embodied therein, for example, as a propagated data signal in baseband or as part of a carrier wave. More specifically, a computer-readable signal medium does not encompass a computer-readable storage medium.

A computer-readable storage medium is a tangible device/hardware that can retain and store a program (instructions) for use by or in connection with an instruction execution system, apparatus, or device, e.g., a computer or other processing device set out more fully herein. Notably, a computer-readable storage medium does not encompass a computer-readable signal medium. Thus, a computer readable storage medium, as used herein, is not to be construed as being transitory signals per se, such as radio waves or other freely propagating electromagnetic waves through a transmission media.

Specific examples (a non-exhaustive list) of the computer-readable storage medium include the following: a hard disk, a random access memory (RAM), a read-only memory (ROM), an erasable programmable read-only memory (EPROM), Flash memory, a portable computer storage device, an optical storage device such as a compact disc read-only memory (CD-ROM) or digital video disk (DVD), or any suitable combination of the foregoing. In particular, a computer-readable storage medium includes computer-readable hardware such as a computer-readable storage device, e.g., memory. Here, a computer-readable storage device and computer-readable hardware are physical, tangible implementations that are non-transitory.

By non-transitory, it is meant that, unlike a transitory propagating signal per se, which will naturally cease to exist, the contents of the computer-readable storage device or computer-readable hardware that define the claimed subject matter persists until acted upon by an external action. For instance, program code loaded into random access memory (RAM) is deemed non-transitory in that the content will persist until acted upon, e.g., by removing power, by over-writing, deleting, modifying, etc.

Moreover, since hardware comprises physical element(s) or component(s) of a corresponding computer system, hardware does not encompass software, per se.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the disclosure.

Having thus described the invention of the present application in detail and by reference to embodiments thereof, it will be apparent that modifications and variations are possible without departing from the scope of the invention defined in the appended claims.

What is claimed is:

1. An industrial system comprising:
an electronic badge worn or otherwise transported by an operator of an industrial vehicle, the electronic badge comprising:
 a processor;
 a badge transceiver coupled to the processor that communicates on a first personal-area network; and
 a sensor that generates measurements corresponding to activity of the operator as the operator performs work tasks including tracking time that the operator is off the industrial vehicle, the measurements stored in memory of the electronic badge;
wherein:
 the electronic badge exchanges information with a badge communicator on the industrial vehicle across the first personal-area network, the exchanged information including the measurements of the sensor, which includes the time tracked by the sensor; and
 an electronic message is communicated from the industrial vehicle to a remote server, the electronic message including the exchanged information collected by the industrial vehicle from the electronic badge.

2. The system of claim 1, wherein:
the sensor comprises an activity sensor operatively configured as a select one of a heartrate sensor, a temperature sensor, or a pedometer; and
the electronic badge exchanges information with the badge communicator on the industrial vehicle such that the exchanged information comprises the activity sensor measurements.

3. The system of claim 1, wherein:
the sensor comprises a select one of an accelerometer, a magnetometer, or a gyroscope coupled to the processor; and
the electronic badge exchanges information with the badge communicator on the industrial vehicle such that the exchanged information comprises the sensor measurements.

4. The system of claim 1, wherein:
the industrial vehicle comprises a vehicle network bus;
the industrial vehicle further comprises a control module communicably coupled to a vehicle transceiver;
the badge communicator communicates with the control module of the industrial vehicle by communicating across the vehicle network bus; and
the electronic message is communicated from the control module to the server using the vehicle transceiver.

5. The system of claim 1, wherein:
the processor of the electronic badge is further operatively programmed to:
 output to the operator, instructions to provide a proper procedure for a task that the industrial vehicle operator must perform.

6. The system of claim 1, wherein the processor of the electronic badge automatically logs the operator into the industrial vehicle when the electronic badge is communicably coupled to the badge communicator of the industrial vehicle.

7. The system of claim 1, wherein:
the electronic badge further comprises at least:
 a second transceiver for communicating across a second personal-area network using at least one of Bluetooth, infrared, ultra-wideband, of Wi-Fi, ZigBee, WiMax, or cellular.

8. The system of claim 7, wherein:
the processor of the electronic badge is programmed to control the badge transceiver and the second transceiver such that the first personal-area network is used in conjunction with the second personal-area network to create a zone around the electronic badge, the zone having an outer perimeter based on the first personal-area network and an inner perimeter based on the second personal-area network.

9. The system of claim 1, wherein:
the electronic badge determines a task for the operator based on an environmental-based location tracking system, from another nearby electronic badge.

10. The system of claim 1, wherein:
the first personal-area network comprises a select one of ultra-wideband, Bluetooth, Wi-Fi, infrared, ZigBee, WiMax, or cellular.

11. The system of claim 1, wherein:
the first personal-area network comprises ultra-wideband.

12. An industrial system comprising:
an electronic badge worn or otherwise transported by an operator of an industrial vehicle, the electronic badge comprising:
  a processor;
  a badge transceiver coupled to the processor that communicates on a first personal-area network; and
  a sensor that generates measurements corresponding to activity of the operator as the operator performs work tasks including counting steps taken by the operator, the measurements stored in memory of the electronic badge;
wherein:
  the electronic badge exchanges information with a badge communicator on the industrial vehicle across the first personal-area network, the exchanged information including the measurements of the sensor, which includes the count measurements of the sensor; and
  an electronic message is communicated from the industrial vehicle to a remote server, the electronic message including the exchanged information collected by the industrial vehicle from the electronic badge.

13. The system of claim 12, wherein:
the industrial vehicle comprises a vehicle network bus;
the industrial vehicle further comprises a control module communicably coupled to a vehicle transceiver;
the badge communicator communicates with the control module of the industrial vehicle by communicating across the vehicle network bus; and
the electronic message is communicated from the control module to the server using the vehicle transceiver.

14. The system of claim 12, wherein:
the electronic badge further comprises at least:
  a second transceiver for communicating across a second personal-area network using at least one of Bluetooth, infrared, ultra-wideband, Wi-Fi, ZigBee, WiMax, or cellular.

15. The system of claim 12, wherein:
the first personal-area network comprises a select one of ultra-wideband, Bluetooth, Wi-Fi, infrared, ZigBee, WiMax, or cellular.

16. The system of claim 12, wherein:
the first personal-area network comprises ultra-wideband.

17. An industrial system comprising:
an electronic badge worn or otherwise transported by an operator of an industrial vehicle, the electronic badge comprising:
  a processor;
  a badge transceiver coupled to the processor that communicates on a first personal-area network; and
  a sensor that generates measurements corresponding to activity of the operator as the operator performs work tasks including counting a number of times the operator bends over to lift something, the measurements stored in memory of the electronic badge;
wherein:
  the electronic badge exchanges information with a badge communicator on the industrial vehicle across the first personal-area network, the exchanged information including the measurements of the sensor, which includes the count measurements of the sensor; and
  an electronic message is communicated from the industrial vehicle to a remote server, the electronic message including the exchanged information collected by the industrial vehicle from the electronic badge.

18. The system of claim 17, wherein:
the first personal-area network comprises a select one of ultra-wideband, Bluetooth, Wi-Fi, infrared, ZigBee, WiMax, or cellular.

19. The system of claim 17, wherein:
the first personal-area network comprises ultra-wideband.

20. The system of claim 17, wherein:
the electronic badge further comprises at least:
  a second transceiver for communicating across a second personal-area network using at least one of Bluetooth, infrared, Wi-Fi, ZigBee, WiMax, or cellular.

* * * * *

UNITED STATES PATENT AND TRADEMARK OFFICE
CERTIFICATE OF CORRECTION

| | | |
|---|---|---|
| PATENT NO. | : 12,124,902 B2 | Page 1 of 1 |
| APPLICATION NO. | : 17/660468 | |
| DATED | : October 22, 2024 | |
| INVENTOR(S) | : Philip W. Swift | |

It is certified that error appears in the above-identified patent and that said Letters Patent is hereby corrected as shown below:

In the Specification

Column 16, Line 2, "microprocessors (g) 1110" should read --microprocessors (µP) 1110--

In the Claims

Column 18, Line 49, Claim 7, "ultra-wideband, of Wi-Fi," should read --ultra-wideband, Wi-Fi,--

Signed and Sealed this
First Day of April, 2025

Coke Morgan Stewart
*Acting Director of the United States Patent and Trademark Office*